United States Patent [19]
Gordon II et al.

[11] Patent Number: 5,914,806
[45] Date of Patent: Jun. 22, 1999

[54] STABLE ELECTROPHORETIC PARTICLES FOR DISPLAYS

[75] Inventors: Joseph Grover Gordon II; Mark Whitney Hart; Sally Ann Swanson, all of San Jose, Calif.

[73] Assignee: International Business Machines Corporation, Armonk, N.Y.

[21] Appl. No.: 09/021,768

[22] Filed: Feb. 11, 1998

[51] Int. Cl.$^6$ .................................................. G02B 26/00
[52] U.S. Cl. ...................... 359/296; 359/321; 106/493; 106/499; 428/402; 345/107; 252/570
[58] Field of Search .................... 359/296, 321; 106/493, 499, 502, 504; 428/402, 403, 405; 345/107; 252/570

[56] References Cited

U.S. PATENT DOCUMENTS

| | | | |
|---|---|---|---|
| 4,285,801 | 8/1981 | Chiang | 252/570 |
| 4,322,487 | 3/1982 | Merrill et al. | 430/37 |
| 4,620,916 | 11/1986 | Zwemer et al. | 359/296 |
| 4,680,103 | 7/1987 | Beilin Solomon I et al. | 359/296 |
| 4,833,464 | 5/1989 | Di Santo et al. | 340/793 |
| 4,880,472 | 11/1989 | Bugnon et al. | 106/493 |
| 4,935,063 | 6/1990 | Costanzi et al. | 106/506 |
| 5,145,524 | 9/1992 | Ganci | 106/493 |
| 5,190,586 | 3/1993 | Mizuguchi et al. | 106/499 |
| 5,206,108 | 4/1993 | Felder et al. | 430/137 |
| 5,298,833 | 3/1994 | Hou | 313/483 |
| 5,380,362 | 1/1995 | Schubert et al. | 106/493 |
| 5,543,054 | 8/1996 | Charkoudian et al. | 210/638 |
| 5,587,242 | 12/1996 | Hou et al. | 428/402 |

OTHER PUBLICATIONS (Unknown Author), "Preparation of Sterically Stabilized Silica Dispersions in Nonaqueous Media", Journal of Colloid and Interface Science, vol. 79, No. 1, Jan. 1981.

P. A. Buining et al., "Preparation of a non–aqueous dispersion of sterically stabilized boehmite rods", Colloids and Surfaces, 64 (1992) 47–55.

M. D. Croucher et al., "Some Physicochemical Properties of Electrophoretic Display Materials", Ind. Eng. Chem. Prod. Res. Dev., 1981, 20, 324–329.

V. Novotny et al., "Optical and Electrical Characterization of Electrophoretic Displays", J. Electrochem. Soc.: Solid–State Science and Technology, Dec. 1979.

R. Liebert et al., "A 512 Character Electrophoretic Display", 1980 Biennial Display Research Conference.

M. A. Hopper et al., "An Electrophoretic Display, Its Properties, Mode and Addressing", IEEE Transactions on Electron Devices, vol. Ed–26, No. 8 Aug. 1979.

S. T. Milner, "Polymer Brushes", Articles, Feb. 22, 1991, Science, vol. 251.

*Primary Examiner*—Loha Ben
*Attorney, Agent, or Firm*—Robert B. Martin

[57] ABSTRACT

Stabilized pigment particles for use in electrophoretic display. Stabilization of the pigment particles is effected by covalently bonding the pigment to a polymeric stabilizer.

10 Claims, 1 Drawing Sheet

STABLE ELECTROPHORETIC PARTICLES FOR DISPLAYS

RELATED APPLICATION

This application relates to U.S. Ser. No. 08/365,270 filed Dec. 28, 1994, entitled ELECTROPHORETIC DISPLAY now U.S. Pat. No. 5,745,094. The contents of that application are incorporated by reference herein.

TECHNICAL FIELD

The present invention relates to an electrophoretic display. In particular it relates to stabilizing pigment particles dispersed in a light transmissive fluid contained in the cell of an electrophoretic display.

BACKGROUND OF THE INVENTION

An electrophoretic display generally comprises a suspension of charged pigment particles colloidally dispersed in a light transmissive liquid contained in a cell. In one embodiment, the cell comprises two parallel and transparent conducting electrode panels. The charged particles are moved between the electrode panels under the influence of an electric field. In an alternative embodiment the cell comprises transparent front window and rear panel and non obstructing collecting and counter electrodes. Charged particles are either dispersed throughout the cell or collected on the collecting electrode. Other embodiments of electrophoretic cells are known to those skilled in the art. During operation of an electrophoretic display, charged pigment particles are moved through the liquid under the influence of an electric field. During this movement, the pigment particles can become agglomerated which hinders effective operation of the cell.

In U.S. Pat. No. 4,285,801, Chiang discloses utilizing ionic fluorinated long chain organic molecules as dispersants for pigments. The molecules are absorbed onto the surface of the pigment particles by ionic interaction. Unfortunately, during operation of the cell the dispersant molecule can in the electric field become separated from the pigment particle causing destabilization of the pigment particle.

There is a continuing need to provide effective stabilization of charged pigment particles in electrophoretic displays to ensure that the particles are effectively suspended to minimize agglomeration.

It is therefore an object of the present invention to provide an improved electrophoretic display. Other objects and advantages will become apparent from the following disclosure.

SUMMARY OF THE INVENTION

The present invention relates to an electrophoretic display comprising a plurality of cells containing a suspension of stabilized charged pigment particles in a light-transmissive fluid. The charged pigment particles are substantially stabilized against agglomeration. Preferably, the particles are discrete particles, and have polymeric stabilizers covalently bonded to their surfaces. Preferably, the particles are organic pigments and the stabilizers are polymers with functional end group. The stabilization preferably hinders the contact between particles and enhances the pigment dispersion and dispersion stability in the fluid.

A more thorough disclosure of the present invention is presented in the detailed description which follows and from the accompanying drawings.

DETAILED DESCRIPTION OF THE INVENTION

Figure 1:
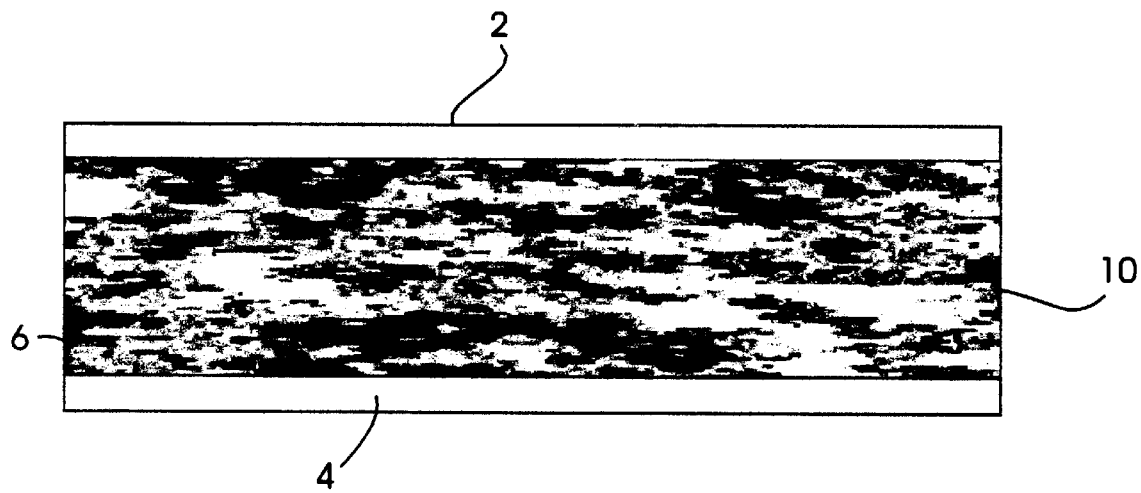
FIG. 1 is a sectional view of an electrophoretic display cell in the dark-image state.

The present invention relates to an electrophoretic cell having pigment particles stabilized against agglomeration. Each pigment particle is covalently bonded to polymeric stabilizers. The pigment particles preferably have stable properties and are charged by methods known in the art. The pigment particles are suitably light scattering or light absorbing. The pigment particle can be black or white or colored such as red, green, or the like.

Suitable pigment particles for use in the present invention include pigment molecules which have one or more primary amine groups. For instance, there are: C.I. Pigment Black 1, Acid Black 48, Acid Blue 25, Acid Blue 29, Acid Blue 40, Acid Blue 41, Acid Blue 129, Acid Red 37, Acridine Yellow G, Acid Yellow 9, Azure A, Azure C, Basic Blue 47, Basic Violet 14, Direct Red 2, Bismark Brown R, Bismark Brown Y, Brilliant Cresyl Blue ALD, Brilliant Sulphaflavine, Direct Blue 1, Basic Orange 2, Direct Red 28, Cresyl Violet acetate, Direct Yellow 62, Disperse Blue 1, Disperse Orange 11, Disperse Yellow 9, Fast Blue BB, Fast Garnet GBC base, Fast Violet B, Solvent Brown 1, Mordant Brown 33, Mordant Brown 48, Mordant Yellow 12, Basic Violet 2, Nuclear Fast Red, Pararosaniline base, Pararosaniline acetate, Phenosafranin, Reactive Blue 2, Reactive Blue 4, Reactive Blue 15, Remazol Brilliant Blue R, Rhodamine 123 hydrate, Safranine O, Toluidine Blue O, or Uniblue A.

Alternative pigment molecules for use in the present invention having one or more hydroxy groups are the following: Acid Alizarin Violet N, Acid Blue 29, Acid Blue 161, Acid Orange 8, Acid Red 8, Acid Red 37, Acid Red 88, Acid Red 97, Acid Red 151, Acid Yellow 34, Acid Yellow 40, Acid Yellow 42, Acid Yellow 76, Acid Yellow 99, Alizarin Blue Black B, Alizarine Red S, Alizarine Yellow GG, Biebrich Scarlet, Brilliant Crocein MOO, Brilliant Yellow, Bromochlorophenol Blue, Bromocresol Green, Bromoscresol Purple, Bromophenol Blue, Promopyrogallol Red, Bromothylmol Blue, Bromoxylenol Blue, Calcion, Carmine, Carmine acid, Cellestine Blue, Chicago Sky Blue 6B, Chlorophenol Red, Chrome Azurol S, Chromotrope 2B, Chromotrope FB, m-Cresol Purple, Cresol Red, Crocein Orange G, Direct Blue 71, Direct Red 23, Direct Red 75, Direct Red 81, Direct Violet 51, Disperse Red 1, Disperse Red 13, Disperse Yellow 7, Eriochrome Black T, Eriochrome Blue Black B, Erythrosin B, Ethyl Eosin, Fast Black K salt, Evans Blue, Fast Green FCF, Flavazin LII, Solvent Yellow 94, Natural Black 1, Hoechst 33342, Hoechst 33258, Coumarin 4, Hydroxy Naphthol Blue, Natural Orange 6, Iodine Blue, Solvent Green 1, Methyl Calcein Blue, Methyl Eosin, Methylthymol Blue, Mordant Brown 1, Mordant Brown 4, Mordant Brown 6, Mordant Brown 24, Mordant Brown 33, Mordant Brown 48, Mordant Orange 1, Mordant Orange 6, Mordant Orange 10, Mordant Red 19, Mordant Yellow 10, Mordant Yellow 12, Naphthochrome Green, Naphthol AS, Naphthol AS B1, Naphthol Blue Black, Acid Red 18, Nitrazine Yellow, Nitrosulfonazol III, Nuclear Fast Red, Oil Red EGN, Oil Red O, Orange G, Palatine Chrome Black 6BN, Palatine Fast Black WAN, Palatine Fast Yellow BLN, Phenol Red, Acid Red 92, Eriochrome Blue SE, Acid Red 150, Purpurin, Pyrocatechol Violet, Pyrogallol Red, Resolic Acid, Sudan II, Sudan III, and Sudan IV, Tartrazine, Thymol Blue, Xylenol Blue, Xylenol Orange, Acid Red 26, or Xylidyl Blue 1.

As a further alternative, the pigment molecule may have one or more carboxylic acid groups or derivatives of carboxylic acids (e.g. ester or amide). These are, for instance: Alizarin Yellow GG, Lucifer Yellow anhydride, Calcein Blue, Carmine, Carmine acid, Celestine Blue, Chrome Azurol S, Chromoxane Cyanine R, Coumarin 343, Solvent Red 72, Disperse Orange 25, Eosin B, Eosin Y, Erythrosin B, Ethyl Red, Solvent Yellow 94, Fluorescent Brightener 28, Methyl Calcein Blue, Methylthymol Blue, Methyl Red, Mordant Orange 1, Mordant Orange 6, Mordant Orange 10, Mordant Yellow 10, Mordant Yellow 12, Naphthochrome Green, Palatine Fast Yellow BLN, Pararosaniline acetate, Rhodamine B, Rose Bengal, or Xylenol Orange.

The polymeric stabilizer is covalently bonded to the pigment. The polymeric stabilizer and pigment particle have complimentary chemical functionality to form the covalent bond. The covalent bond is suitably formed through a divalent linkage such as amide, ester, ether, amine, organosilane group, silyl ether or carbamate linkage group. Suitable divalent linkages include:

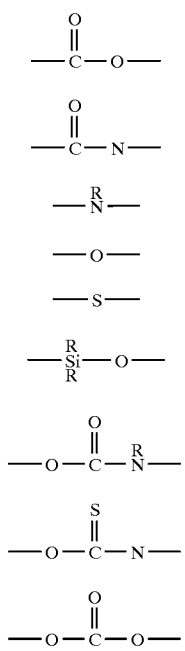

Preferred examples of the polymeric stabilizer are: monofunctionalized polystyrene, polyauryl methacrylate, poly(1, 2-hydroxystearic acid), polydimethylsiloxane, polyisobutylene, cis-1,4-polyisoprene, polyvinyl acetate, polymethylmethacrylate, polyvinyl methyl ether, poly(4-methylstyrene), polyethylene, polybutadiene, terpene resins, petroleum hydrocarbon resin, or their halogenated analogs. The polymer can have a carboxylic acid groups or a carboxylic acid derivative as the functional end group to attach to the pigment via an amide bond. These polymers are particularly useful for use with pigments which have one or more primary amine groups.

Another form of the polymer has a carboxylic acid or a carboxylic acid derivative as a functional end group to attach to the pigment via an ester bond. Such polymers are particularly useful where the pigment molecule has one or more hydroxy groups. In yet anther form of the invention, the polymer has an amine or hydroxy functional end group to bond to a carboxy group on the pigment via an amide or ester bond. Such polymers are particularly useful with pigment molecules that have one or more carboxylic acids or derivatives.

In other embodiments where the pigment molecule has one or more alcohol or phenol groups, the polymer can have alkyl halide or alkyl sulfates as functional end groups to bond to the pigment via ether linkages.

In other embodiments where the pigment molecules has one or more alcohol or phenol groups, the polymer can have isocyanate as a functional end group to bond to the pigment via carbamate linkages.

In other embodiments where the pigment molecule has one or more alcohol, halo or phenol groups, the polymer can have an alcohol or phenol or a derivative of an alcohol or phenol as a functional end group to bond to the pigment via ether linkages.

In other embodiments where the pigment molecule has one or more alcohol or phenol groups, the polymer can have a reactive silane (such as trialkoxy, triacetoxy, trihalo, or trihydro silane) as a functional end group to bond to the pigment via silyl ether linkages.

In other embodiments where the pigment molecule has one or more carboxylic acid or carboxylic acid derivative, epoxide, alkyl halide or alkyl sulfate, isocyante, alcohol or phenol or a derivative thereof, or reactive silane (a described above) groups as indicated; the polymer can have a alkoxide or aroxide as a functional group to attach to the pigment via an ester, β-hydroxy ether, ether, carbamate, ether or silyl ether linkages respectively.

There are other functional group pairs which can react and form covalent bonds. These will be known to those skilled in the art and can also be used to covalently bond polymeric stabilizers to pigment particles.

The stabilized pigment particles with covalently bonded polymeric stabilizer are collodially suspended in a light-transmissive fluid, preferably clear fluid. The fluid is preferably dielectric and substantially free of ions. The fluid preferably has minimum solvent action on the pigments. Suitable fluids include those which are more effective than theta solvents for polymeric stabilizers.

Examples of suitable combinations of polymeric stabilizer and fluids are:

a) Poly(isobutene) with ethylbenzene, toluene;

b) 1,4-Poly(butadiene) with n-heptane, ethyl propyl ketone;

c) Poly(p-chlorostyrene) with ethylbenzene, ethyl chloroacetate;

d) Poly(styrene) with i-amyl acetate, ethyl acetate, i-propyl acetate, n-propyl acetate, toluene;

e) Poly(ethyl methacrylate) with methyl-n-propyl ketone, m-xylene;

f) PMMA with acetone, benzene, butanone, n-butyl acetate, dichloroethane, ethyl acetate, toluene;

g) Poly(dimethylsiloxane) with benzene, cyclohexane, n-butyl acetate, chlorobenzene, n-haptane, n-hexane, methylcyclohexane, methylcyclopentane, n-nonane, n-octane, n-propyl acetate, toluene, xylene; and h) Poly(p-methylstyrene) with toluene, diethylsuccinate.

The stabilized pigments are dispersed in the fluid to form a stable colloidal suspension. Optionally, other components can be added to the suspension such as charge control additives, dispersants, and surfactants to improve the performance of the suspension. Suitable additives include sodium dioethlsulfosuccinate, zirconium octoacte, and metal soaps such as lecithin, barium petronate, calcium petronate, alkyl succinimide, iron naphthenate, and polyethylene glycol sorbitan stearate as well as homologes of these compounds.

With the present invention, there is provided polymeric stabilizer which is covalently bonded to an organic pigment. As such, the stabilizer prevents or hinders agglomeration of the pigment particles, and generally prevents pigment particles from coming into relative contact with each other. This improves the pigment dispersion and dispersion stability in the liquid.

Figure 2:
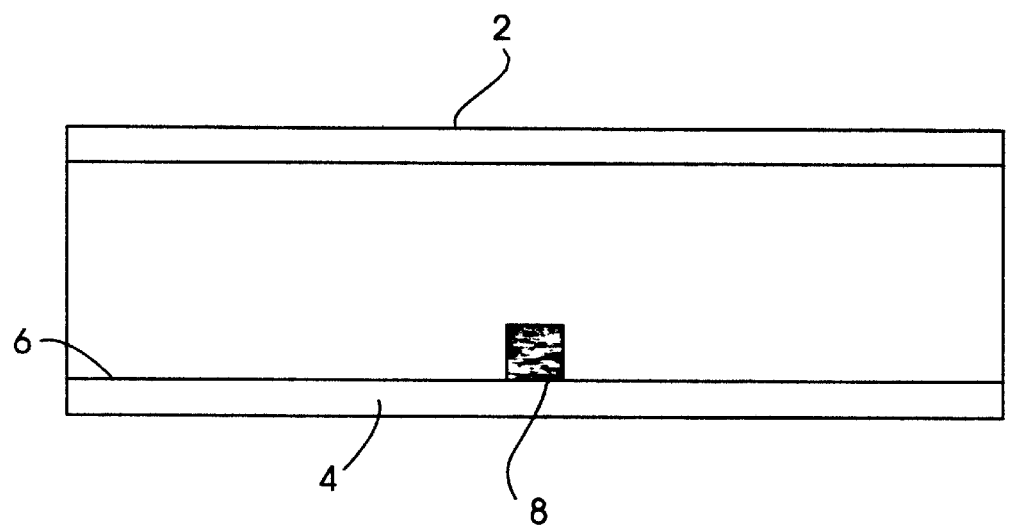
FIG. 2 is a sectional view of an electrophoretic display cell in the light-image state.

Referring to FIGS. 1 and 2, there is shown a preferred embodiment electrophoretic display cell in accordance with the present invention. The cell generally comprises a front light-transmissive counterelectrode 2 (functioning as the front window), a horizontal rear panel 4 having a light-reflective surface 6 facing the electrode 2, and a non-obstructing collecting electrode 8 disposed in the cell and spaced from the front electrode. The discrete stabilized charged pigment particles are dispersed in a suspension 10 which is disposed in the space between the front electrode 2 and the rear panel 4.

In FIG. 1, in the dark or opaque state (noncollected state), the stabilized pigment particles are generally uniformly dispersed in the suspension between the front counterelectrode 2 and rear reflective panel 4. The incident, ambient light is absorbed by the pigment particles to create a black image. In FIG. 2, the cell is in the collected state. The stabilized charged pigment particles in the suspension are attracted to and collected on the non-obstructing collecting electrode 8. This permits the transmissive of incident ambient light through the cell and reflects off the reflective surface 6 and back through the cell to create a light image. The light image has good contrast against the black or pigment-colored image of FIG. 1. Electrophoretic display cells are known in the art such as disclosed in U.S. Pat. Nos. 4,218,302, 4,650,288 and U.S. Ser. No. 08/365,270 filed Dec. 28, 1994; and Dalisa, "Electrophoretic Displays", *Top, Appl, Phys.,* Vol. 40, pp. 213–232, Display Devices (1980), the disclosures of which are incorporated herein by reference.

The following example is a detailed description, of the present invention. The details fall within the scope of, and serve to exemplify, the more general description set forth above. The example is presented for illustrative purposes only, and is not intended as a restriction on the scope of the invention.

EXAMPLE I

Pigment Stabilization 2 g of Pigment Black 1 (Paliotol Black L 0080 from BASF) and 5 g of monocarboxy terminated poly(styrene) (with M.W. 200,000 from Scientific Polymer Products, Inc.) were mixed with 40 ml toluene and 100 g of 2 mm zirconium oxide beads in a teflon jar. The jar was shaken on a paint shaker (Model 5410 Red Devil Company) overnight. The contents of the jar was transferred with toluene rinsing to a 250 ml round bottom flask and heated to reflux with magnetic stirring under a Dean-Stark trap. The suspension was refluxed for 2 hours, cooled to 50° C. and 1 ml tributylamine, 15.6 mg 2-chloro-N-methylpyridinium toluene-4-methylsulfonate, and 7.7 mg 3,4-dihydro-2-pyrido[1,2-a]-pyrimidinone were added and the suspension was taken to reflux again with stirring under the Dean-Stark trap and refluxed overnight. After cooling to room temperature, the suspension was transferred back into the teflon jar and was shaken on the paint shaker overnight. The suspension was removed from the zirconium beads, transferred to centrifuge tubes and spun at 20,000 rpm for 2 hours. The supernatant was discarded and the solid was resuspended in freshly distilled toluene (from Na metal). The centrifugation and resuspension procedure was repeated three more times. The final suspension concentrated was determined by weighing the residue obtained from the evaporation of a weighed aliquot of the suspension. The efficiency of polymer attachment was determined by elemental analysis of the dried suspension. The % C-% N ratio increased from 5.59 for the unreacted pigment (theory is 5.14) to 10.92 which indicates there is an average of 74 additional carbon atoms associated with each pigment molecule. This means there are 208 dye molecules for each attached polymer strand.

EXAMPLE II 5 g of pigment black 1 (Paliotol Black L 0080 from BASF) and 5 g of monocarboxy terminated poly (dimethylsiolxane) (with M.W. 5,000 from Gelest, Inc. or United Chemical Technologies, Inc.) were mixed with 60 g toluene and 200 g of 2 mm zirconium oxide beads in a teflon jar. The jar was shaken on a paint shaker (Model 5410 Red Devel Company) overnight. The contents of the jar was transferred with toluene rinsing to a 500 ml round bottom flask and heated to reflux with magnetic stirring under a Dean-Stark trap. The suspension was refluxed for 2 hours, cooled to 50° C. and 2 ml tributylamine, 32 mg 2-chloro-N-methylpyridinium toluene-4-methylsulfonate, and 15.5 mg 3,4-dihydro-2-pyrido[1,2-a]-pyrimidinone were added and the suspension was taken to reflux again with stirring under the Dean-Stark trap and refluxed overnight. After cooling to room temperature, the suspension was transferred back into the teflon jar and was shaken on the paint shaker overnight. The suspension was removed from the zirconium beads, transferred to centrifuge tubes and spun at 20,000 rpm for 2 hours. The supernatant was discarded and the solid was resuspended in freshly distilled toluene (from Na metal. The centrifugation and resuspension procedure was repeated two more times. The final suspension concentration was determined by weighing the residue obtained from the evaporation of a weighed aliquot of the suspension. The efficiency of polymer attachment was determined by elemental analysis of the dried suspension. The % C-% N ratio increased from 5.59 for the unreacted pigment (theory is 5.14) to 7.87 which indicates there is an additional 35 carbon atoms associated with each pigment molecule. The % Si-% N ratio was 1.90 which indicates there is an additional 10 silicon atoms associated with each pigment molecule. This means there are between 4 and 7 dye molecules for each attached polymer strand. The particles here are much smaller than those in example 1.

Although this invention has been described with respect to specific embodiments, the details thereof are not to be construed as limitations, for it will be apparent that various embodiments, changes, and modifications may be resorted to without departing from the spirit and scope thereof, and it is understood that such equivalent embodiments are intended to be included within the scope of this invention.

What is claimed is:

1. A composition useful in electrophoretic display devices comprising a pigment particle covalently bonded to a polymeric stabilizer.

2. The composition of claim 1 wherein the covalent bond is through an amide, ester, ether, amine, organosilane, silyl ether or carbamate linkage.

3. The composition of claim 2 wherein the polymeric stabilizer is monofunctionalized polystyrene, polylauryl methacrylate, poly(1,2-hydroxystearic acid), polydimethylsiloxane, polyisobutylene, cis-1,4- polyisoprene, polyvinyl acetate, polymethylmethacrylate, polyvinyl methyl ether, poly(4-methylstyrene), polyethylene, polybutadiene, terpene resins, petroleum hydrocarbon resin, or a halogenated analogue of any of these compounds.

4. The composition of claim 2 wherein the pigment is selected from the group consisting of: C.I. Pigment Black 1, Acid Black 48, Acid Blue 25, Acid Blue 29, Acid Blue 40, Acid Blue 41, Acid Blue 129, Acid Red 37, Acridine Yellow G, Acid Yellow 9, Azure A, Azure C, Basic Blue 47, Basic Violet 14, Direct Red 2, Bismark Brown R, Bismark Brown Y, Brilliant Cresyl Blue ALD, Brilliant Sulphaflavine, Direct Blue 1, Basic Orange 2, Direct Red 28, Cresyl Violet acetate, Direct Yellow 62, Disperse Blue 1, Disperse Orange 11, Disperse Yellow 9, Fast Blue BB, Fast Garnet GBC base, Fast Violet B, Solvent Brown 1, Mordant Brown 33, Mordant Brown 48, Mordant Yellow 12, Basic Violet 2, Nuclear Fast Red, Pararosaniline base, Pararosaniline acetate, Phenosafranin, Reactive Blue 2, Reactive Blue 4, Reactive Blue 15, remazol Brilliant Blue R, Rhodamine 123 hydrate, Safranine O, Toluidine Blue O, or Uniblue A.

5. The composition of claim 2 where the pigment has at least one hydroxy group, and is selected from the group consisting of: Acid Alizarin Violet N, Acid Blue 29, Acid Blue 161, Acid Orange 8, Acid Red 8, Acid Red 37, Acid Red 88, Acid Red 97, Acid Red 151, Acid Yellow 34, Acid Yellow 40, Acid Yellow 42, Acid Yellow 76, Acid Yellow 99, Alizarin Blue Black B, Alizarine Red S, Alizarine Yellow GG, Biebrich Scarlet, Brilliant Crocein MOO, Brilliant Yellow, Bromochlorophenol Blue, Bromocresol Green, Bromoscresol Purple, Bromophenol Blue Promopyrogallol Red, Bromothylmol Blue, Bromoxylenol Blue, Calcion, Carmine, Carminic acid, Celestine Blue, Chicago Sky Blue 6B, Chlorophenol Red, Chrome Azurol S, Chromotrope 2B, Chromotrope FB, m-Cresol Purple, Cresol Red, Crocein Orange G, Direct Blue 71, Direct Red 23, Direct Red 75, Direct Red 81, Direct Violet 51, Disperse Red 1, Disperse Red 13, Disperse Yellow 7, Eriochrome Black T, Eriochrome Blue Black B, Erythrosin B, Ethyl Eosin, Fast Black K salt, Evans Blue, Fast Green FCF, Flavazin LII, Solvent Yellow 94, Natural Black 1, Hoechst 33258, Coumarin 4, Hydroxy Naphthol Blue, Natural Orange 6, Iodine Blue, Solvent Green 1, Methyl Calcein Blue, Methyl Eosin, Methylthymol Blue, Mordant Brown 1, Mordant Brown 4, Mordant Brown 6, Mordant Brown 24, Mordant Brown 33, Mordant Brown 48, Mordant Orange 1, Mordant Orange 6, Mordant Orange 10, Mordant Red 19, Mordant Yellow 10, Mordant Yellow 12, Naphthochrome Green, Naphthol AS, Naphthol AS BI, Naphthol Blue Black, Acid Red 18, Nitrazine Yellow, Nitrosulfonazol III, Nuclear Fast Red, Oil Red EGN, Oil Red O, Orange G. Palatine Chrome Black 6BN, Palatine Fast Black WAN, Palatine Fast Yellow BLN, Phenol Red, Acid Red 92, Eriochrome Blue SE, Acid Red 150, Purpurin, Pyrocatechol Violet, Pyrogallol Red, Resolic Acid, Sudan II, Sudan III, and Sudan IV, Tartrazine, Thymol Blue, Xylenol Blue, Xylenol Orange, Acid Red 26, or Xylidyl Blue 1.

6. The composition of claim 2 wherein the pigment has at least one carboxylic acid group or derivative, and is selected from the group consisting of: Alizarin Yellow GG, Lucifer Yellow anhydride, Calcein Blue, Carmine, Carminic acid, Celestine Blue, Chrome Azurol S, Chromoxane Cyanine R, Coumarin 343, Solvent Red 72, Disperse Orange 25, Eosin B, Eosin Y, Erythrosin B, Ethyl Red, Solvent Yellow 94, Fluorescent Brightener 28, Methyl Calcein Blue, Methylthymol Blue, Methyl Red, Mordant Orange 1, Mordant Orange 6, Mordant Orange 10, Mordant Yellow 10, Mordant Yellow 12, Naphthochrome Green, Palatine Fast Yellow BLN, Pararosaniline acetate, Rhodamine B, Rose Bengal, or Xylenol Orange.

7. An electrophoretic display comprising a plurality of cells containing pigment particles covalently bonded to polymeric stabilizers and suspended in a light-transmissive fluid, each cell comprising a light-transmissive front window, a collecting and counter electrode and a rear panel.

8. A display as claimed in claim 7 including a non-obstructing collecting electrode and a rear panel having a reflective surface.

9. A display as claimed in claim 7 including a non-obstructing collecting electrode and a rear panel which is light absorbing.

10. A display as claimed in claim 7 wherein the rear panel is light transmissive.

* * * * *